No. 884,749. PATENTED APR. 14, 1908.
G. W. MASON.
PIPE COUPLING.
APPLICATION FILED MAY 1, 1907.
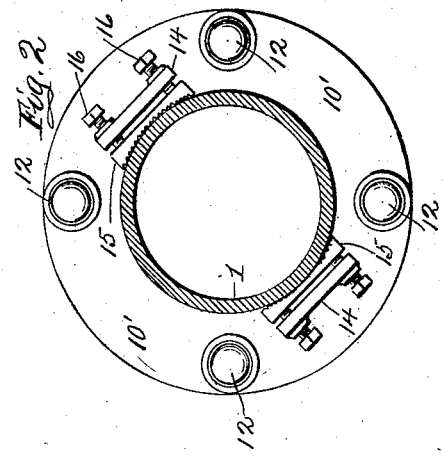
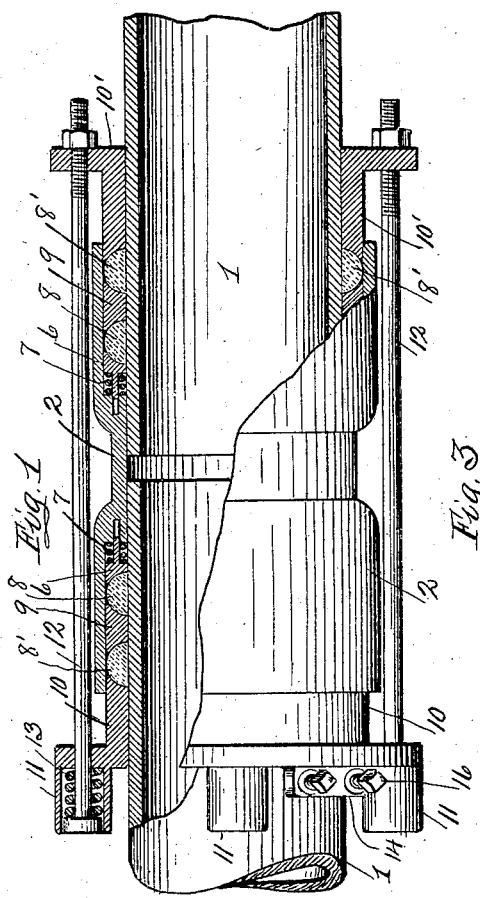
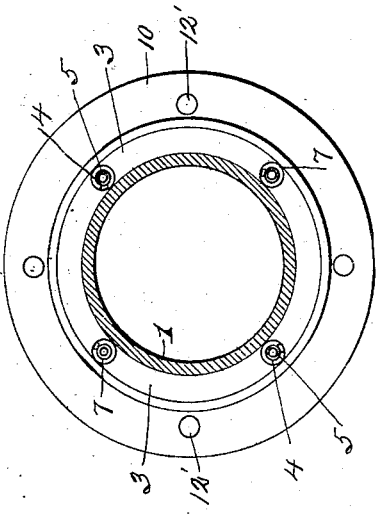
Witnesses:
Thomas E. Rodley
Katherine A. Murray
Inventor.
George W. Mason.
by his Attorney
W. E. Harrison.

UNITED STATES PATENT OFFICE.

GEORGE W. MASON, OF SHARON, PENNSYLVANIA.

PIPE-COUPLING.

No. 884,749.　　　　Specification of Letters Patent.　　　　Patented April 14, 1908.

Application filed May 1, 1907. Serial No. 371,241.

*To all whom it may concern:*

Be it known that I, GEORGE W. MASON, a citizen of the United States, residing at Sharon, in the county of Mercer and State of Pennsylvania, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improved pipe coupling and it comprises a means whereby pipes may be coupled together without the use of screw threads, a means to permit the said pipes to expand and contract under varying degrees of temperature, and the invention further consists in the arrangement of packing to prevent leakage and the invention still further consists in the certain details of construction and combination of parts, as will be fully described hereinafter.

In the accompanying drawings:—Figure 1 is a side sectional elevation of my improved pipe coupling, a part of which is shown in outside elevation, said view showing the details of construction in accordance with my invention. Fig. 2 is an end elevation of the coupling. Fig. 3 is an end elevation of the coupling having one of the glands, packing and packing rings removed therefrom, said view showing the pockets in which small spiral springs are arranged to force one of said packing rings against the rubber packing.

To put my invention into practice and thereby provide a pipe coupling that will be simple in construction and durable in its parts, I form from cast or other suitable metal an annular or cylindrical body portion 2, the central inner bore being the same diameter as that of the pipe 1, on which it is to be used and at each side of this central bore are enlargements 3, for the reception of two glands 10 and 10', which fit neatly therein and are capable of movement in the direction of the length of the coupling. Arranged in the shoulders formed by the large and small diameters of the body portion, are a series of small openings or sockets 5, which receive pins formed integral with an annular packing ring 6, the said pins being used to support and maintain intermediate spiral springs 7, which tend to press said rings outward against a soft rubber packing ring 8. Arranged next to these last mentioned rubber packing rings are separating rings 9, formed of suitable metal and having the edges undercut to conform with the contour of the packing rings 8 and 8', against which it rests. Outside of these outer rings 8' are glands 10 and 10' the inner edges being undercut in the same manner as the separating rings 9, and each of said glands being provided with a flange through which bolt openings are formed. These bolt openings 12' receive bolts 12, one end being formed with a head and the other provided with screw nuts, and the said bolts fitted with strong spiral springs 13, which tend to force the glands 10 and 10' inward. These springs 13 are protected by hoods 11, cast upon the face of the gland 10, and the said gland 10 together with the opposite gland 10', formed with outwardly-projecting flanges 14, through which threaded openings are made for the reception of set screws 16. Each gland is formed with two of these flanges 14, arranged diametrically opposite to each other, and intervening between said flanges and the pipe 1 are barbed pieces 15, which serve to hold the coupling fixed to prevent creeping along the length of said pipe, due to expansion and contraction of the same.

To assemble the parts of the coupling and make a perfect connection, the ends of the pipe 1 are inserted in the body portion 2, (see Fig. 1, of the drawings) the same being divided equally between the two members, the small spiral springs 7 and metallic rings 6, being first placed in position. The rubber packing rings 8 are now placed and followed by the separating rings 9, after which the second set of rubber packing rings 8' are inserted. The glands 10 and 10' are now placed and the bolts 12 with their springs 13, threaded through their proper openings and the nuts put in place. These nuts are tightened which will press the glands inward or towards each other thereby compressing the soft rubber packing rings against the pipes 1 and the enlarged bore of the body portion 2, making a tight connection. The barbed pieces 15 are then set by means of the screws 16 to keep the coupling in position. The outer springs 13 and inner springs 7, will permit the pipe to expand and contract without disturbing the parts of said coupling.

It is obvious that various changes may be made in the details of construction, such as using a single packing ring in place of double, and other modifications without departing from the spirit of the invention. Therefore I do not wish to confine myself to the exact construction, shown and described, but wish to claim all such modified forms, as would come, properly within the general scope of the invention.

Having thus described my invention, what I claim, and desire to secure by Letters Patent, is—

In combination with the meeting ends of pipe sections, a coupling therefor comprising a body portion arranged over the adjoining ends of the pipes, said portion having large and small bores to form inner shoulders, spring actuated wings arranged in said body adjacent the shoulders, glands fitting in the ends of the body portion and provided with flanges, wings interposed between the spring actuated means and the glands, bolts secured to the flange at one of the glands and extending loosely through the flange of the second gland, the ends of the portions passing loosely through the flange being provided with heads, springs interposed between the flange and the heads of the bolts and protecting hoods for the springs carried by the flange.

In testimony whereof, I affix my signature, in presence of two witnesses.

GEORGE W. MASON.

Witnesses:
  THOMAS E. REDDY,
  KATHERINE A. MURRAY.